US012291394B1

(12) United States Patent
Hoagland

(10) Patent No.: US 12,291,394 B1
(45) Date of Patent: May 6, 2025

(54) TRASH CAN AND METHOD OF USE

(71) Applicant: Jason Hoagland, Fort Worth, TX (US)

(72) Inventor: Jason Hoagland, Fort Worth, TX (US)

( * ) Notice: Subject to any disclaimer, the term of this patent is extended or adjusted under 35 U.S.C. 154(b) by 47 days.

(21) Appl. No.: 17/500,743

(22) Filed: Oct. 13, 2021

Related U.S. Application Data

(63) Continuation of application No. 17/191,237, filed on Mar. 3, 2021, now abandoned.

(51) Int. Cl.
*B65F 1/14* (2006.01)

(52) U.S. Cl.
CPC .......... *B65F 1/14* (2013.01); *B65F 2220/108* (2013.01)

(58) Field of Classification Search
CPC ............................. B65F 1/14; B65F 2220/108
USPC ................................................. 220/4.26, 630
See application file for complete search history.

(56) References Cited

U.S. PATENT DOCUMENTS

| | | | | | |
|---|---|---|---|---|---|
| 2,814,409 | A * | 11/1957 | Perez | B65F 1/141 220/622 |
| 5,758,888 | A * | 6/1998 | Burgan | B65F 1/14 280/79.5 |
| 8,584,327 | B1 * | 11/2013 | Kodak | A61G 17/041 220/4.28 |
| 9,905,094 | B1 * | 2/2018 | Hooper | B65D 25/22 |
| 11,180,316 | B1 * | 11/2021 | Harris | B65F 1/00 |
| 2023/0032263 | A1 * | 2/2023 | Ganz | B65F 1/02 |

* cited by examiner

*Primary Examiner* — Stephen J Castellano
(74) *Attorney, Agent, or Firm* — Richard Eldredge; Leavitt Eldredge Law Firm

(57) ABSTRACT

A trash can that can be broken down for washing is disclosed. The trash can includes a lid, one or more intermediate segments, a base connecting segment having a female connector, a base having a male connector, one or more fasteners, and one or more magnets. The one or more fasteners allows the lid to engage with an intermediate segment; an intermediate segment with another intermediate segment; and an intermediate segment with the base connecting segment. The one or more magnets allows the base connecting segment to engage with the base. The one or more female connectors engage with the one or more male connectors. The trash can also includes a link rod sustained by one or more rod supports.

1 Claim, 6 Drawing Sheets

TRASH CAN AND METHOD OF USE

BACKGROUND

1. Field of the Invention

The present invention relates generally to trash cans, and more specifically to a trash can configured to be broken down readily for cleaning.

2. Description of Related Art

Trash cans are well known in the art and are effective means for containing and holding trash and other wastes until permanent disposal. Commonly in the art, trash cans employ a trash bag or liner to contain trash and its associated odor. However, trash bags can tear easily, leading to trash contaminating the trash can. Moreover, trash cans often have large volumes, making it difficult for users to clean the trash can's interior cavity effectively. Hence, there is a need for a trash can capable of dividing into segments, thereby allowing a user to clean the trash can more effectively.

Accordingly, although great strides have been made in the area of trash cans, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
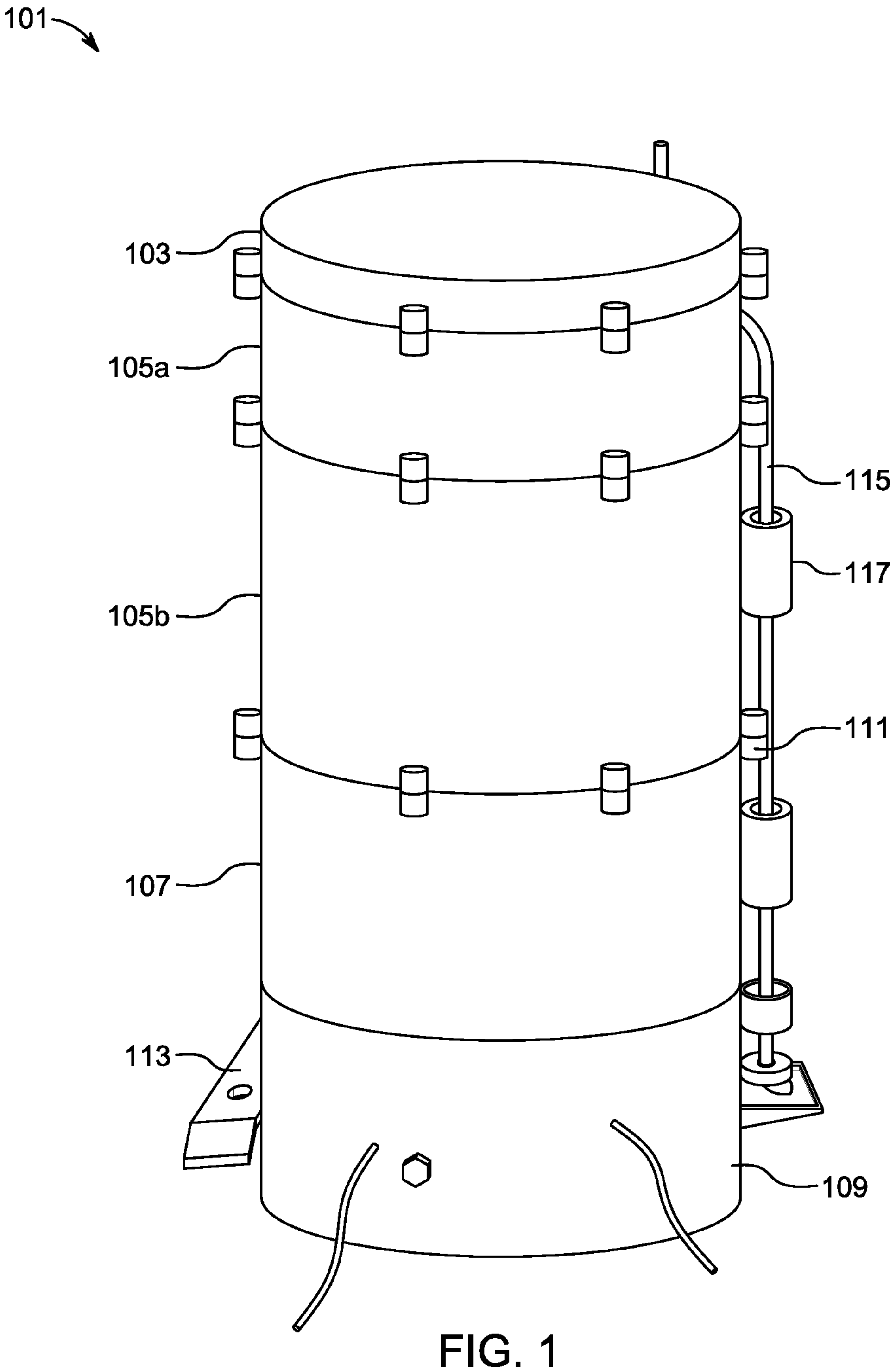
FIG. 1 is a front view of a trash can in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional trash cans. Specifically, the present invention reduces the effort required to clean a trash can. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
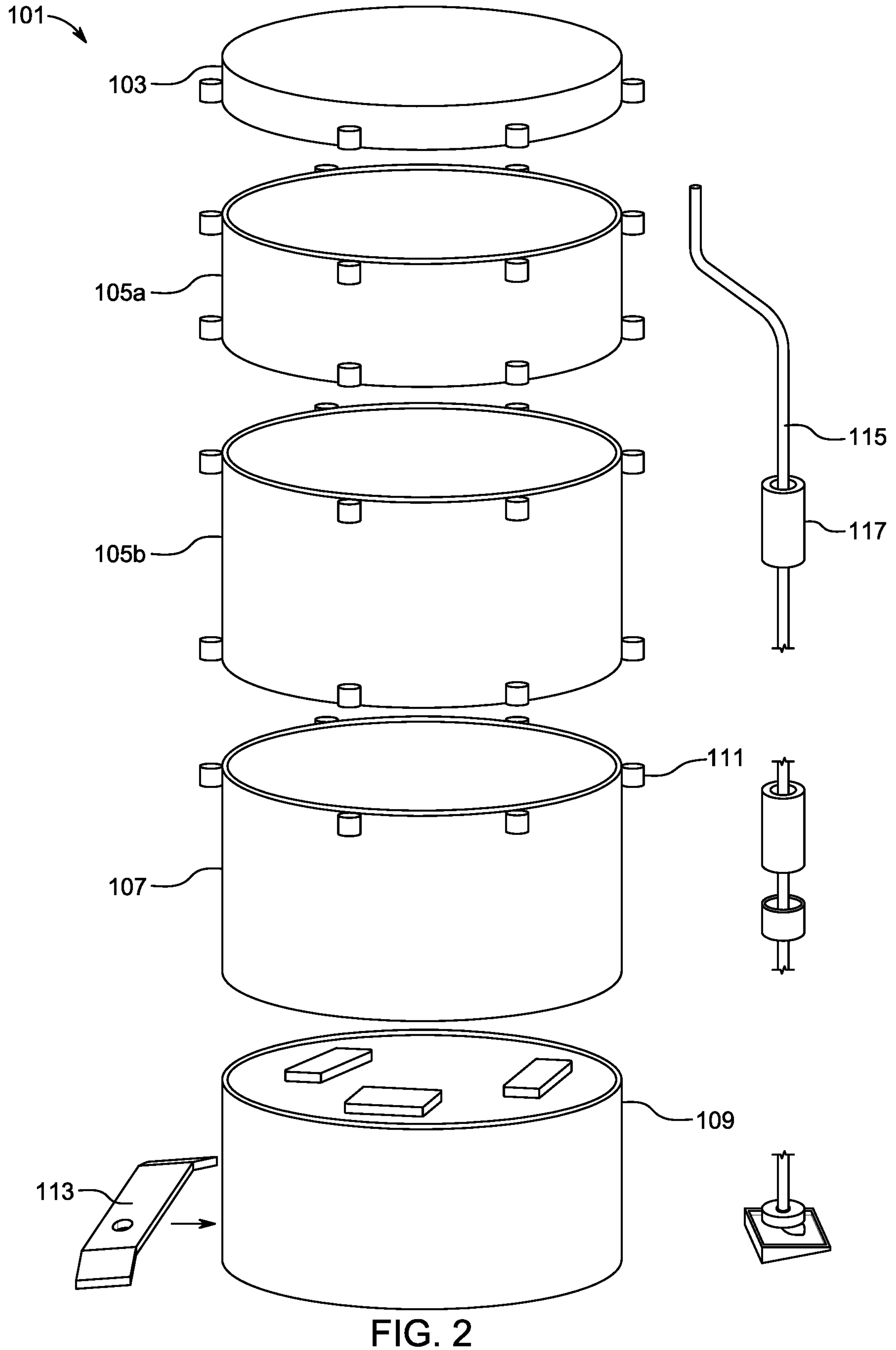
FIG. 2 is an exploded view of the trash can of FIG. 1.

Referring now to the drawings wherein like reference characters identify corresponding or similar elements throughout the several views, FIGS. 1 and 2 depict various views of a trash can in accordance with a preferred embodiment of the present application. It will be appreciated that the trash can 101 overcomes one or more of the above-listed problems commonly associated with conventional trash cans. It should also be appreciated that the trash can 101 may vary based on aesthetical, functional, or manufacturing considerations.

In the contemplated embodiment, the trash can 101 includes a lid 103, one or more intermediate segments (e.g., intermediate segments 105*a*, 105*b*), a base-connecting segment 107, a base 109, one or more fasteners 111, and one or more magnets 113.

The lid 103 removably couples to the top portion of an intermediate segment, for instance, intermediate segment 105*a*, via the one or more fasteners 111. In some embodiments, the lid 101 may removably couple to the top portion of the base-connecting segment 107 via the one or more fasteners 111. Additionally, an intermediate segment may removably couple to another intermediate segment, for instance, intermediate segments 105*a*, 105*b*, via the one or more fasteners 111. In addition, an intermediate segment, for instance, intermediate segment 105*b*, may removably couple to the base-connecting segment 107 via the one or more fasteners 111. Further, the base-connecting segment 107 removably couples to the base 109 via the one or more magnets 113.

It should be appreciated that the one or more fasteners 111 may be any fastening attachment including, without limitation, preferably magnets, clasps, clips, hook-and-loop, twist locks, or the like.

The trash can 101 further includes a link rod 115 that extends upwardly along the base 109, base-connecting segment 107, intermediate segments 105*a*, 105*b*, and lid 103 via one or more rod supports 117. The link rod 115 is configured to provide stability to the overall structure of the trash can 101.

It should be appreciated that although the trash can 101 is shown having a generally cylindrical shape, it is contemplated that the trash can 101 may have any suitable configuration, i.e., rectangular, triangular, linear, square, oval or another appropriate geometry.

It should also be appreciated that one of the unique features believed characteristic of the present application is the inclusion of the one or more fasteners and the one or more magnets that provide for easy assembly and disassembly of the trash can, thereby allowing a user to clean the trash can more effectively.

Figure 3:
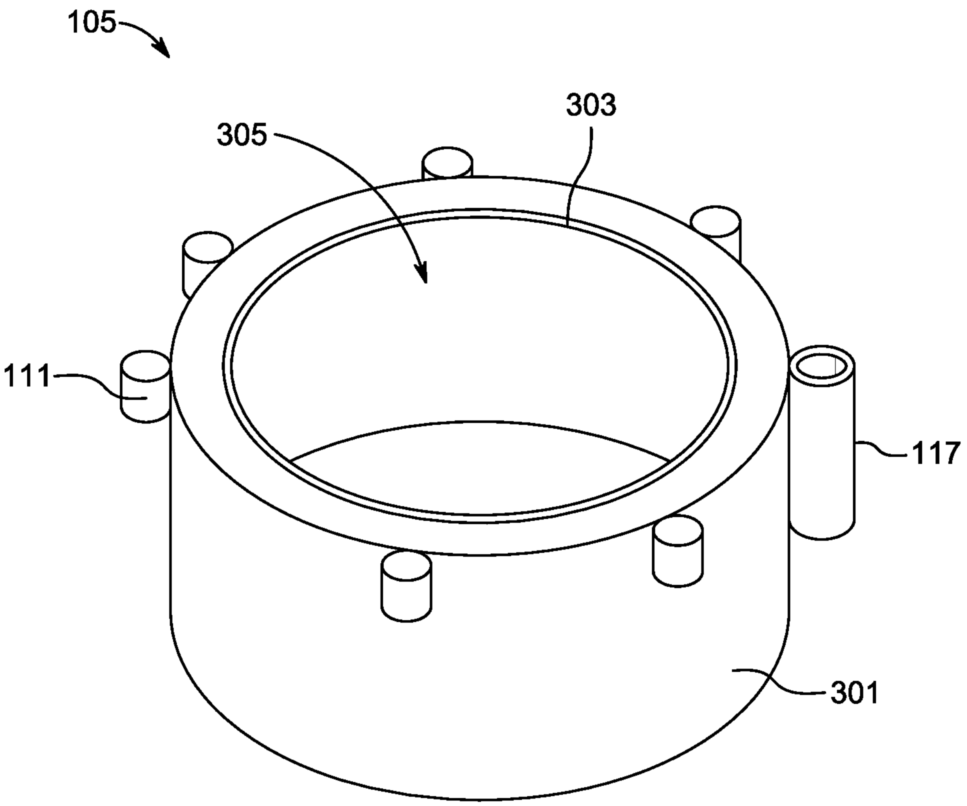
FIG. 3 is a top view of the intermediate segment for the trash can of FIG. 1.

In FIG. 3, a top view of the intermediate segment 105 is depicted. As shown, the intermediate segment 105 includes an outer shell 301, an inner liner 303, and an inner cavity 305. It should be appreciated that the outer shell 301 and the inner liner may be made of any material including, without limitation, stainless steel, aluminum, other metals, resin, polyethylene, other plastics, or any combination or multiplicity thereof.

Figure 4:
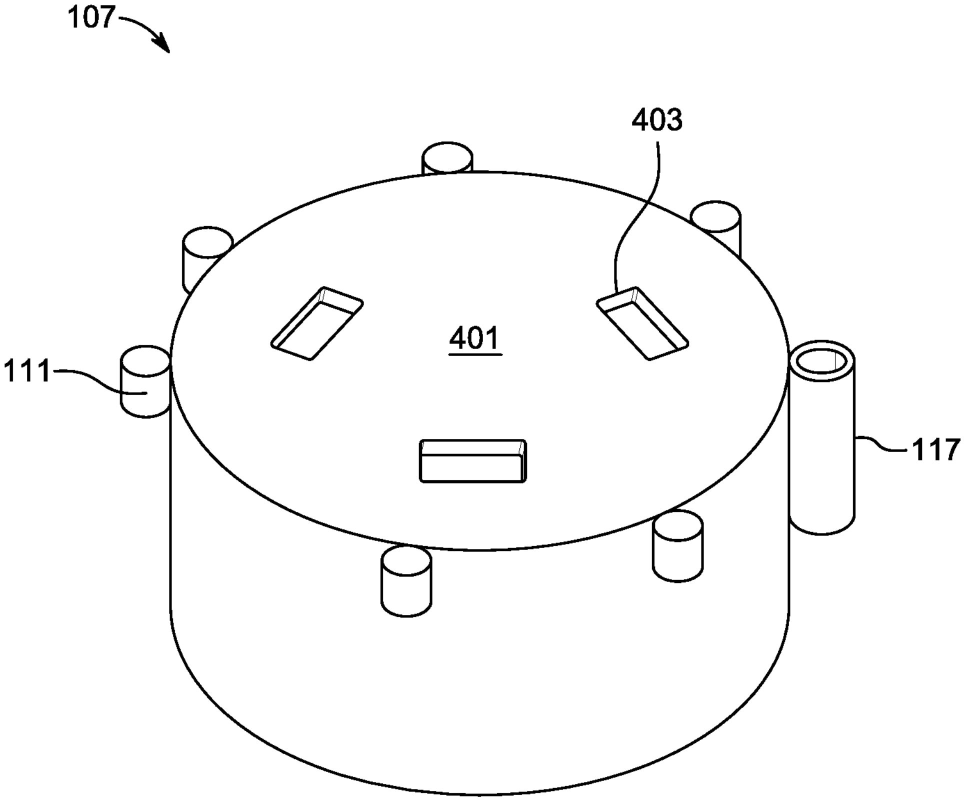
FIG. 4 is a bottom view of the base connecting segment for the trash can of FIG. 1.

In FIG. 4, a bottom view of the base-connecting segment 107 is illustrated. As shown, the base-connecting segment 107 includes a bottom surface 401 having one or more female connectors 403 configured to receive one or more male connectors 503 (not shown, see FIG. 5) therein.

Figure 5:
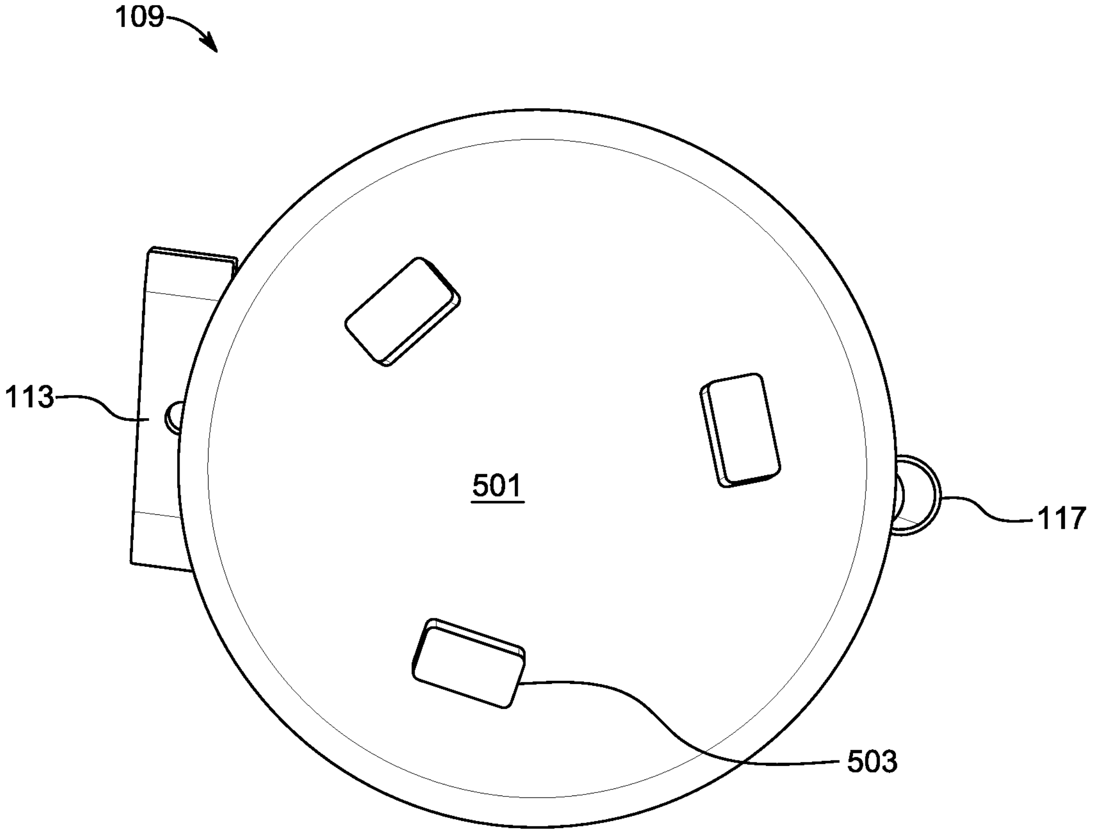
FIG. 5 is a top view of the base for the trash can of FIG. 1.

In FIG. 5, a top view of the base 109 is depicted. As shown, the base 109 includes a top surface 501 having one or more male connectors 503 configured to insert into the one or more female connectors 403.

Figure 6:
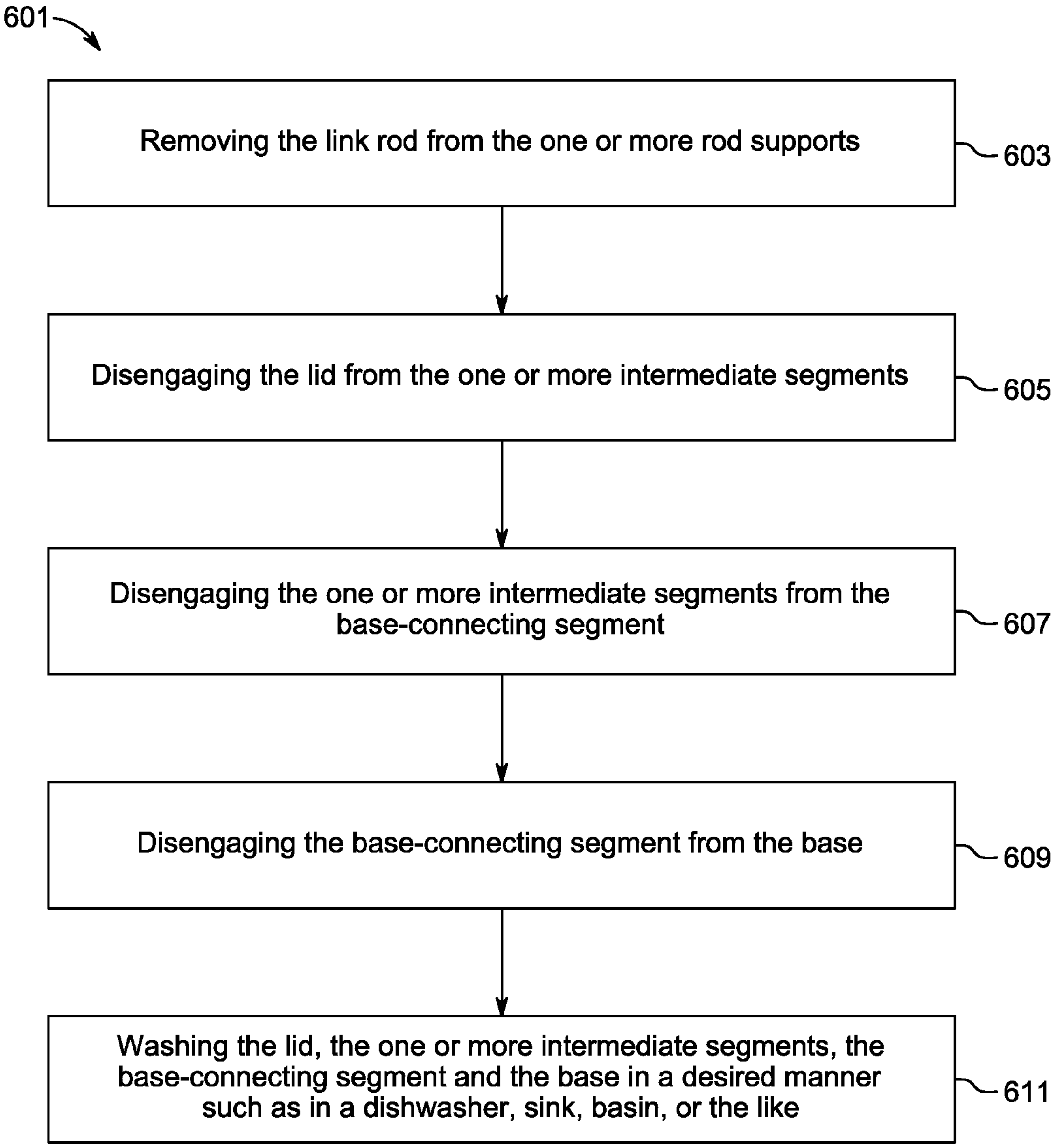
FIG. 6 is a flowchart of a method of use of the trash can of FIG. 1.

In FIG. 6, a flowchart 601 depicts a simplified method of use associated with the trash can 101. During use, the link rod is removed from the one or more rod supports, as shown with box 603. Once the link rod is removed, the lid is disengaged from the one or more intermediate segments, the one or more intermediate segments are disengaged from the base connecting segment, and the base connecting segment is disengaged from the base, as shown with boxes 605-609. The user may then proceed to cleaning or washing the lid, the one or more intermediate segments, the base connecting segment, and the base in a desired manner such as in a dishwasher, sink, basin, or the like.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A trash can, comprising:

a lid;

one or more intermediate segments, the one or more intermediate segments having: an outer shell; an inner liner; and an internal cavity;

a base connecting segment having a plurality of female connectors;

a base having a top surface with one or more male connectors that extend from the top surface, the plurality of female connectors are configured to releasably engage with the male connectors, wherein rotational movement of the base and the base connecting segment is restricted when the plurality of female connectors are connected to the one or more male connectors;

one or more magnets secured to and extending from the outer shell of each of the one or more intermediate segments, the one or more magnets are configured to engage with each other, which in turn secures the one or more intermediate segments to each other;

a link rod that extends a length of the one or more intermediate segments stacked on each other; and one or more rod supports secured to the outer shell of each of the one or more intermediate segments and configured to receive the link rod, the link rod is configured to extend an entire length of the base connecting segment;

wherein the lid engages with the intermediate segment via the one or more magnets; wherein the intermediate segment engages with the base connecting segment via the one or more magnets; wherein the plurality of female connectors engages with the one or more male connectors; and wherein the link rod extends upwardly along the base, the one or more intermediate segments, and the lid via the one or more rod supports.

* * * * *